(12) United States Patent  
Morales Hernandez et al.

(10) Patent No.: US 11,985,064 B1  
(45) Date of Patent: May 14, 2024

(54) DETECTING STATIC ROUTES IN A NETWORK

(71) Applicant: Amazon Technologies, Inc., Seattle, WA (US)

(72) Inventors: Christine Estefania Morales Hernandez, Dublin (IE); Ahmed Negm, Dublin (IE); Thomas Bradley Scholl, Seattle, WA (US); Suresh Ambalavanan, Dublin (IE); Keerthi Krishnan, Dublin (IE); Michael W. Palladino, Renton, WA (US); Valentin Iulian Neacsu, Dublin (IE); Fiachra John Groarke, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/083,216

(22) Filed: Dec. 16, 2022

(51) Int. Cl.  
*H04L 45/748* (2022.01)  
*H04L 41/0604* (2022.01)  
*H04L 45/125* (2022.01)

(52) U.S. Cl.  
CPC ........ *H04L 45/748* (2013.01); *H04L 41/0627* (2013.01); *H04L 45/125* (2013.01)

(58) Field of Classification Search  
None  
See application file for complete search history.

(56) References Cited

U.S. PATENT DOCUMENTS

| 11,115,309 B1* | 9/2021 | Scholl .................... H04L 43/12 |
| 2022/0141103 A1* | 5/2022 | Gandham ............. G06F 16/235 370/254 |

\* cited by examiner

*Primary Examiner* — Joshua Joo  
(74) *Attorney, Agent, or Firm* — Klarquist Sparkman, LLP

(57) ABSTRACT

A detection mechanism is disclosed for identifying peers transmitting network traffic towards a cloud provider using routing prefixes that were not advertised for that peer. Once detected, an alarm condition can occur and the peer notified to remove any static route configurations. In one embodiment, a collector server computer can be used to acquire routing prefixes advertised to a peer. A second server computer can be used to obtain network traffic received from the peer. A comparison can then be made between the advertised prefixes and the network traffic being received. If network traffic is being received for unadvertised prefixes, then an alarm condition can occur. The detection mechanism can regularly inspect active traffic flows against BGP route advertisements at fixed intervals. For peers that are identified that are not in compliance with route advertisements, the alarm condition can occur for follow-up remediation.

20 Claims, 6 Drawing Sheets

DETECTING STATIC ROUTES IN A NETWORK

BACKGROUND

Cloud providers connect to hundreds of public Internet Exchanges in partner colocation datacenters worldwide. On each Internet Exchange, a cloud provider can connect to hundreds of external networks (called peers) to deliver traffic to those networks and their customers. The Border Gateway Protocol (BGP) is a routing protocol to exchange routes between the cloud provider and these external peers. When route advertisements are withdrawn on a BGP session between peers, it is expected that the traffic on the underlying physical links will subside. For example, it may be desirable to take an edge network device out of service. In such a case, route advertisements can be withdrawn such that when traffic on the edge network device reaches a sufficiently low threshold level, the edge network device can be taken offline. However, sometimes traffic inbound from the peer does not drain completely to zero, even after the routes are withdrawn or blocked. This is due to the peer configuring static routing of traffic towards the cloud provider, which can be a violation of peering policy. With the static routing of traffic continuing even with the routes withdrawn or blocked, the edge network device may not reach the necessary traffic thresholds to withdraw it from service. As a result, necessary repairs can be delayed, which compromises network efficiency.

DETAILED DESCRIPTION

A detection mechanism is disclosed for identifying peers transmitting network traffic towards a cloud provider using routing prefixes that were not advertised for that peer. Once detected, an alarm condition can occur and the peer can be notified to remove any static route configurations. In one embodiment, a collector server computer can be used to acquire routing prefixes advertised to a peer. A second server computer can be used to obtain network traffic received from the peer. A comparison can then be made between the advertised prefixes and the network traffic being received. If network traffic is being received for unadvertised prefixes, then an alarm condition can occur. For example, if a cloud provider advertises routes A, B, C to a peer but incoming traffic from that peer is seen to be for routes B, C, D, E, then routes D and E are likely static routes that violate the peering policy. As such, the peer can be alerted about the violating routes. The detection mechanism can regularly inspect active traffic flows against BGP route advertisements at fixed intervals. For peers that are identified that are not in compliance with route advertisements, the alarm condition can occur for follow-up remediation. The alarm condition can be internal to the cloud provider and an administrator can decide how to correct the alarm condition.

Figure 1:
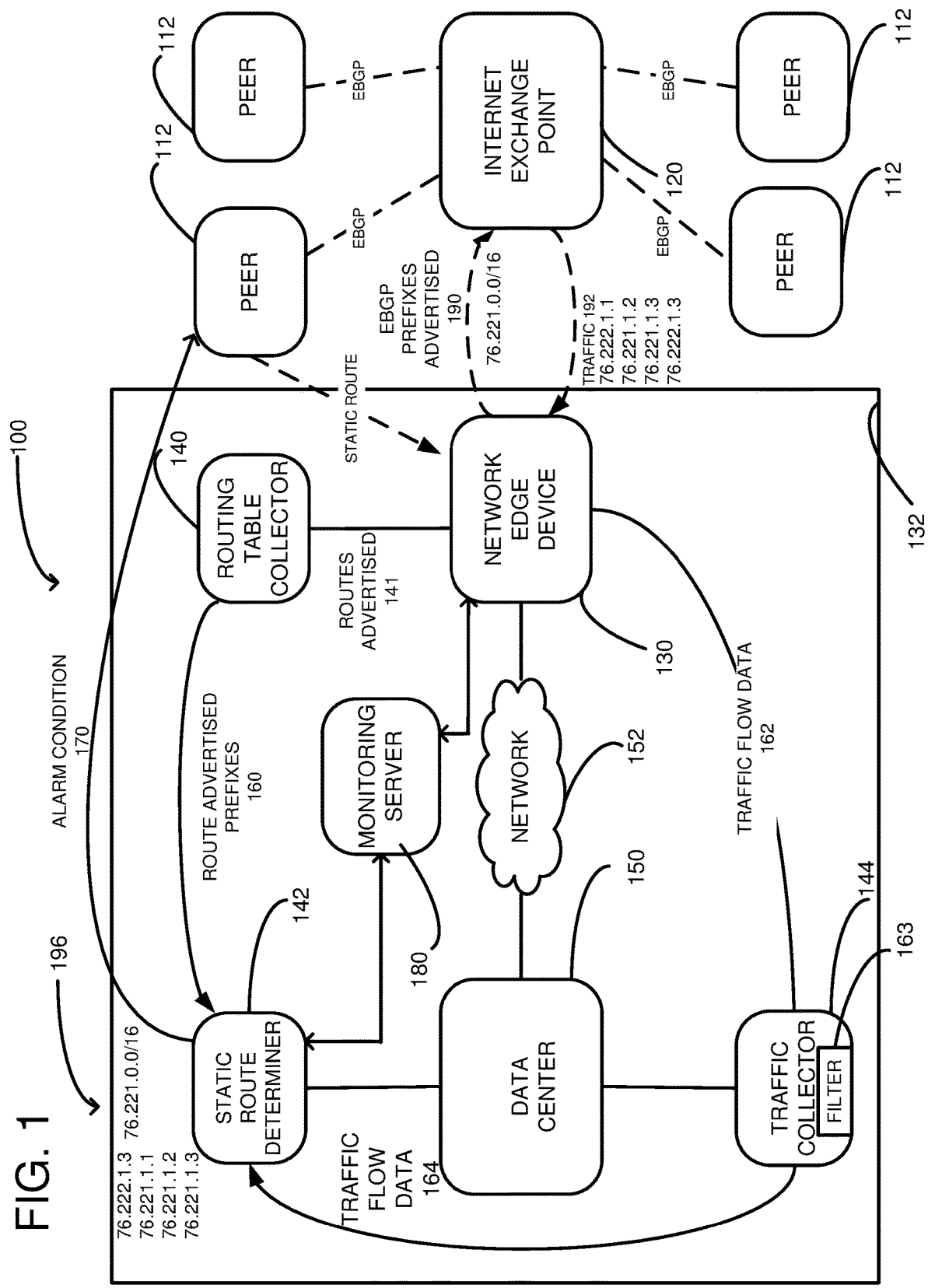
FIG. 1 is a system including a network edge device and a back-end server computer for detecting static routes transmitted through the network edge device.

FIG. 1 shows a system 100 for detecting static routes in a network. A plurality of peer networks 112 allow for communication to different autonomous systems (not shown). The peer networks 112 are coupled to an Internet exchange point 120 that can be within a same transit center as a network edge device 130. Although the Internet exchange point 120 is shown, other networking connections can be used, such as a direct peering connection. The communication protocol used between peers 112, the Internet exchange point 120, and the network edge device 130 can be external BGP (eBGP), but other protocols can be used. The network edge device 130 can be a type of switch or router and is within a compute service provider 132. The compute service provider 132 can include a plurality of server computers, such as a routing table collector server computer 140, a static route determiner server computer 142, and a traffic collector server computer 144. Generally, the server computers 140, 142, 144 are within a data center 150 but can be external to the data center. The data center 150 can be coupled to the network edge device 130 via a network 152 internal to the compute service provider 132. The routing table collector 140 can communicate with the network edge device 130 and acquire a routing table including routes advertised 141 by the network edge device 130. The communication between the routing table collector 140 and the network edge device 130 generally occurs via the network 152, although it is shown as a direct connection. The routing table collector 140 can extract advertised prefixes from entries in the routing table then reformat the data as needed and transmit prefixes advertised 160 to the static route determiner 142. The traffic collector server computer 144 can also collect traffic flow data 162 from the network edge device. This communication can also occur via the network 152. The traffic flow data 162 can include source and destination IP addresses, which can be converted into prefix data for transmission to the static route determiner 142, as shown at 164. Additionally, the traffic collector 144 can filter the traffic flow data 162 using filter 163 so that only network traffic flowing into the compute service provider 132 is included in the traffic data 164. Outgoing packets from the compute service provider 132 towards the Internet exchange point 120 are removed.

The static route determiner 142 can compare the route advertisement prefixes 160 to the actual traffic data 164 and determine matching prefixes. Any prefixes that do not match are in violation of the eBGP protocol and are likely to be static routes. An alarm condition can occur due to the mismatched prefixes and the alarm condition can result in transmission to the source IP address associated with each mismatched prefix, as shown at 170. The alarm condition 170 can be a request to discontinue transmission of static routes. Although the alarm condition 170 is shown being transmitted from the static route determiner 142 to the peer 112, the alarm condition can be internal and handled by an administrator of the static route determiner 142 or an administrator of the compute service provider 132. A monitoring server computer 180 can be coupled to the traffic collector 144 and receive updates in terms of a volume of traffic passing through the network edge device 130. The monitoring server 180 can update the routing table in the network edge device 130 to modify the prefixes advertised such that a reduction in network traffic occurs. However, static routes can continue despite the desired reduction. Consequently, the alarm condition 170 can further cause a reduction in network traffic towards the network edge device until a threshold level is reached, at which time, the monitoring server 180 can implement other strategies for reducing static routes, such as by filtering static routes.

A simple example is shown where eBGP routes advertised are shown at 190 as 76.22.0.0/16. Incoming traffic can be seen at 192 as including prefixes 76.222.1.1, 76.221.1.2, 76.221.1.3 and 76.222.1.3. The prefixes advertised are compared to the actual prefixes received, as shown at 196. Only prefix 76.222.1.3 is not included in the route advertised prefixes. Consequently, the prefix 76.222.1.3 is considered a detected static route. A source IP address can then be used that was received with the packet having the prefix 76.222.1.3 and that source IP address can be notified to remove the determined static route.

Figure 2:
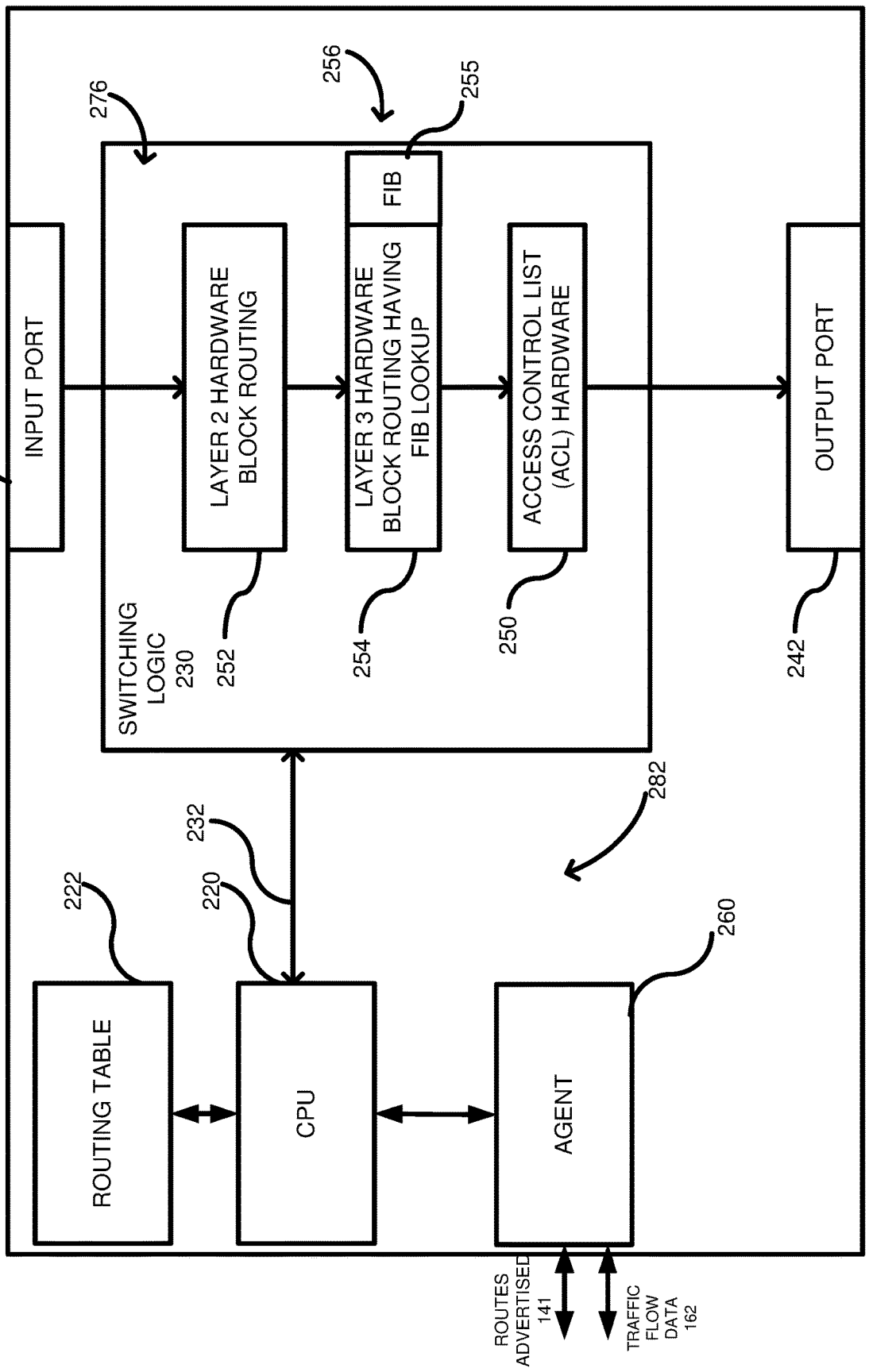
FIG. 2 is an example of the network edge device of FIG. 1.

FIG. 2 shows a detailed example of an embodiment of the network device 130 of FIG. 1. The network device 130 can be any switch for forwarding packet data including, but not limited to, a router, a switch, a load balancer, a firewall, etc. Network device 130 can be a switch that routes packets to a next hop in the network using a destination Internet Protocol (IP) address. A central processing unit (CPU) 220 is coupled to a routing table 222 and to switching logic 230 through a bus 232 (PCIe or other protocols and bus types can be used). Although a CPU is shown, any desired controller can be used including a processor in an application-specific integrated circuit (ASIC) or any other type of processor. The switching logic 230 is positioned between an input port 240 and an output port 242, which are typically adapted to receive network cables, such as Ethernet cables. Although the input port 240 and output port 242 are shown as a single port, it should be understood that there are actually many ports that the network packets can be routed to. The switching logic 230 can be a single ASIC integrated circuit or divided into multiple integrated circuits. The switching logic 230 can include multiple different hardware logic blocks including a Layer 2 hardware block 252, a Layer 3 hardware block 254, and an Access Control List (ACL) hardware block 250. The layer 2 hardware block 252 relates to an Ethernet layer and can forward packets based on Media Access Control (MAC) tables (not shown). The layer 3 hardware block 254 relates to forwarding based on a longest prefix match of an IP address. Layer 3 typically involves a route lookup, decrementing a Time-To-Live (TTL) count, calculating a checksum, and forwarding the frame with the appropriate MAC header to the correct output port. The route lookup of the layer 3 hardware can include searching within a Forwarding Information Base (FIB) 255, which includes destination addresses for packets being transmitted through the switching logic 230 and rewriting the packets in accordance with the lookup. The FIB 255 is derived from the routing table 222 and is loaded by the CPU 220. The network device 210 can run routing protocols, such as an Open Shortest Path First (OSPF) or a Routing Information Protocol (RIP), to communicate with other Layer 3 switches or routers. The FIB is used to lookup the route for an incoming packet. The ACL block 250 relates to permissions and can include rules whether to drop packets. More specifically, the ACL block can provide rules that are applied to different ports. Additionally, the ACL block can have rules that are applied to designated IP addresses. The ACL block can control outbound packets and, in this sense, it is similar to a firewall. The layer 2 hardware 252, the layer 3 hardware 254 and the ACL 250 together form an ingress pipeline 256. The different hardware blocks can be coupled in series and additional hardware blocks can be added based on the design. Typical network packets pass from the input port 240 to the output port 242 in accordance with the configuration of the hardware logic blocks 250, 252, and 254.

As shown, an agent 260 can execute on the CPU 220 and can be used to extract traffic flow data passing through the network device 130. For example, the agent can receive passive monitoring data of source and destination addresses being transmitted through the switching logic 230. The agent 260 can then respond to requests for the traffic flow data, such as is shown in FIG. 1, wherein the traffic collector 144 is receiving traffic flow data 162 from the network edge device. In addition, the agent 260 can respond to requests for the routing table 222, such as is shown at 141 in FIG. 1, wherein the routing table collector 140 receives the routes advertised from the network edge device 130. Additionally, although an agent 260 is shown, the routing table collector 140 can pull routing table information from the routing table 222 without the need for the agent. For example, the network device 130 can be logged into and a script can be executed on the CPU 220 to obtain the routing table 222. The information pulled from the routing table 222 can be the full routing table or a subset of the routing table.

Figure 3:
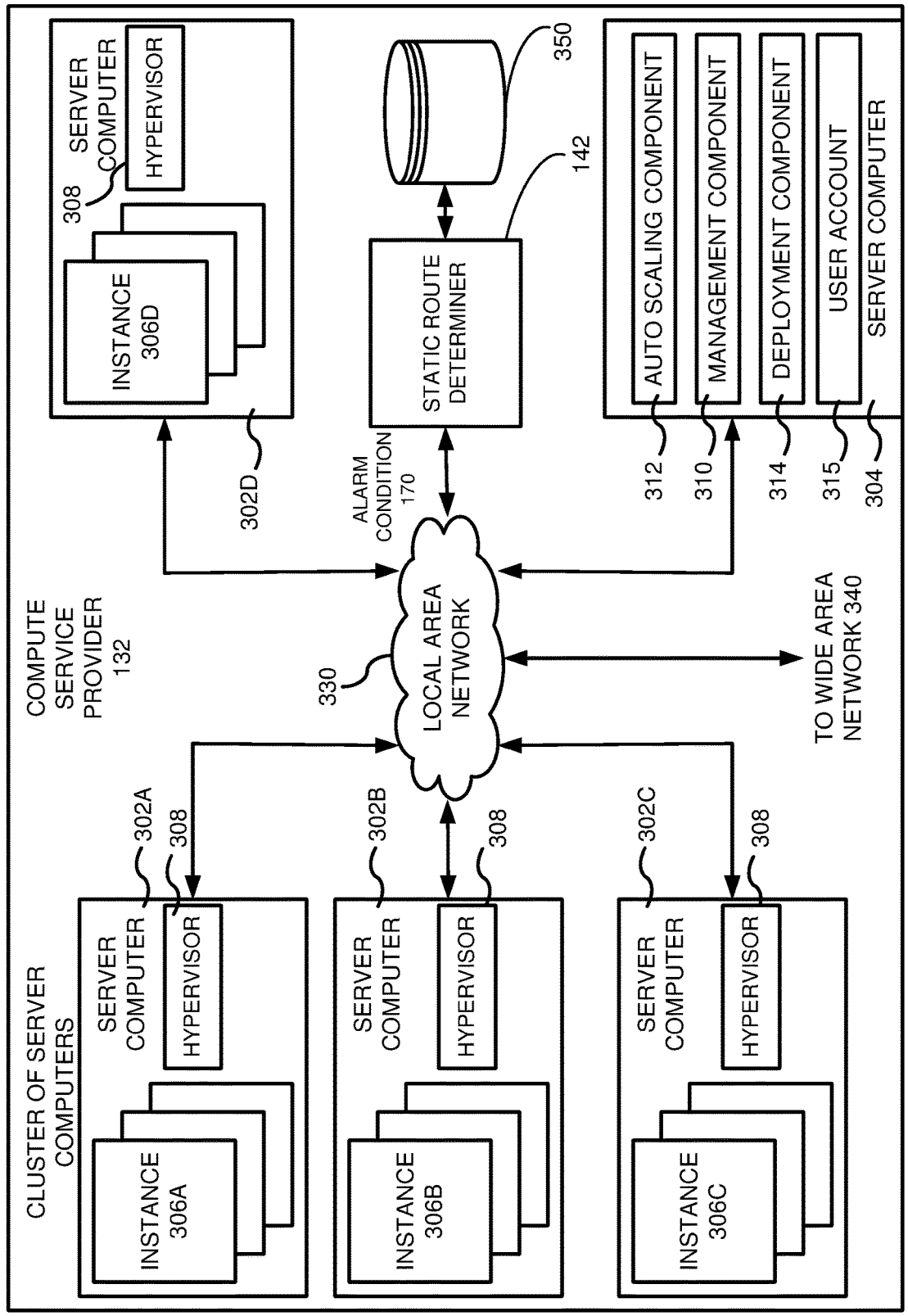
FIG. 3 is an example system diagram showing a plurality of virtual machine instances running in a multi-tenant environment, including the back-end server computer of FIG. 1.

FIG. 3 is a computing system diagram of a network-based compute service provider 132 that illustrates one environment in which embodiments described herein can be used. By way of background, the compute service provider 132 (i.e., the cloud provider) is capable of delivery of computing and storage capacity as a service to a community of end recipients. In an example embodiment, the compute service provider can be established for an organization by or on behalf of the organization. That is, the compute service provider 132 may offer a "private cloud environment." In another embodiment, the compute service provider 132 supports a multi-tenant environment, wherein a plurality of customers operate independently (i.e., a public cloud environment). Generally speaking, the compute service provider 132 can provide the following models: Infrastructure as a Service ("IaaS"), Platform as a Service ("PaaS"), and/or Software as a Service ("SaaS"). Other models can be provided. For the IaaS model, the compute service provider 132 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 132 using networked client devices, such as desktop computers, laptops, tablets, smartphones, etc. running web browsers or other lightweight client applications. Those skilled in the art will recognize that the compute service provider 132 can be described as a "cloud" environment.

In some implementations of the disclosed technology, the computer service provider 132 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 132 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example of virtual machine, each of the servers 302A-302D can be configured to execute a hypervisor 308 or another type of program configured to enable the execution of multiple instances 306 on a single server. Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 330 can be utilized to interconnect the server computers 302A-302D and the server computer 304. The network 330 can be a local area network (LAN) and can be connected to a Wide Area Network (WAN) 340 so that end customers can access the compute service provider 132. It should be appreciated that the network topology illustrated in FIG. 3 has been simplified and that many more networks and networking devices can be utilized to interconnect the various computing systems disclosed herein.

The static route determiner 142 can execute on a server computer similar to server computers 302A-302D and instances 306 can be used to perform the static route determination. Alternatively, a stand-alone server computer can be used to execute the static route determiner 142. The traffic data 164 and the route advertised prefixes 160 can be written directly into a database 350 coupled to the static route determiner 142. The static route determiner 142 can perform any necessary translation of the data stored in the database 350 so as to compare the advertised prefixes to the received traffic data 164. For example, a subtraction can be performed to identify any prefixes that are received but were not advertised. If static routes are found, the alarm condition 170 can be transmitted through the local network 330 for transmission over the wide area network 340 to the source of the static routes in a request to cease transmission of the static routes.

Figure 4:
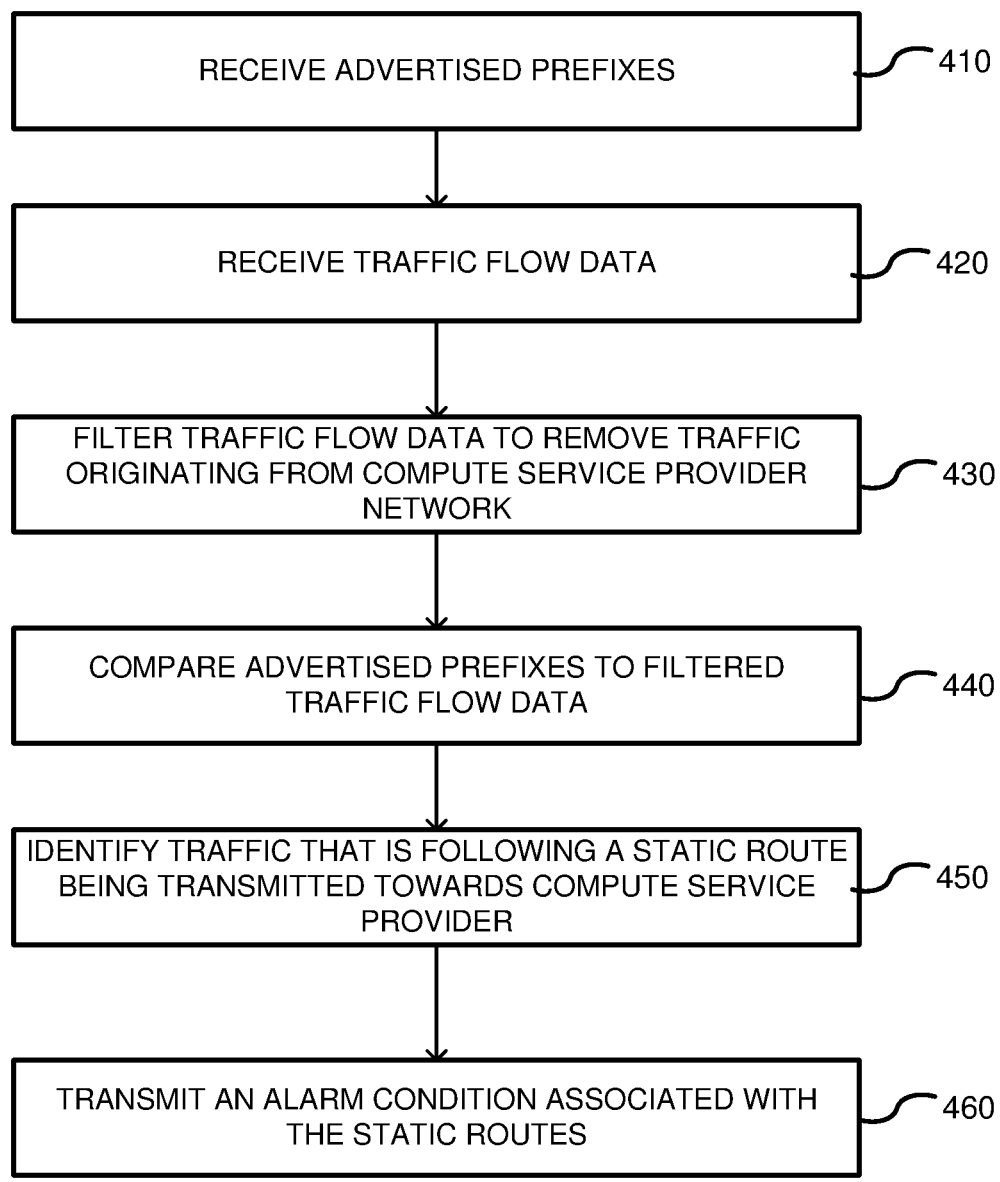
FIG. 4 is a flowchart according to one embodiment to identify static routes being transmitted through the network edge device of FIG. 1.

FIG. 4 is a flowchart according to a first embodiment for detecting static routes in a network device. In process block 410, advertised prefixes are received. For example, in FIG. 1, the static route determiner 142 receives route advertised prefixes 160 that originated from the network edge device 130. In process block 420, traffic flow data is received. For example, in FIG. 1, the traffic data 164 can be received by the static route determiner 142. In process block 430, the traffic flow data is filtered to remove traffic originating from the compute service provider. The traffic flow data 164 can be traffic in only one direction, which is traffic transmitted towards the compute service provider 132 and it can be filtered using filter 163. Although FIG. 1 shows the filter 163 within the traffic collector, the filtering can also occur in the static route determiner. In process block 440, the advertised prefixes are compared to the filtered traffic flow data. For example, in FIG. 1, the static route determiner 142 can perform a comparison on the route advertised prefixes 160 and the traffic flow data 164 to determine whether they match. In process block 450, if the received traffic does not match advertised prefixes, then such prefixes that do not match can be considered static routes. In process block 460, an alarm condition can be transmitted, wherein the alarm condition is associated with the static routes. For example, in FIG. 1 the alarm condition 170 can be transmitted to the peer 112. To identify the peer 112, the source IP address transmitted with the packet is the address of the peer 112. Alternatively, the alarm condition can be sent to a network administrator that can determine how to mitigate the static routes. Possible mitigation techniques include filtering the static routes at the network edge device to reduce or eliminate traffic that is following the static routes. Another mitigation technique can include contacting peers requesting removal of the static routes. Other techniques can be used.

Figure 5:
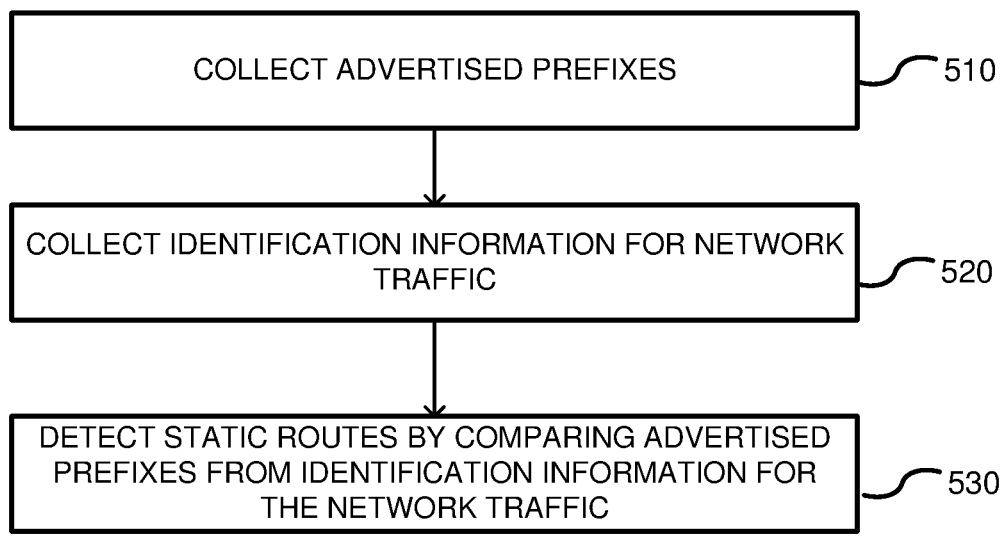
FIG. 5 is a flowchart according to another embodiment to identify static routes being transmitted through the network edge device of FIG. 1.

FIG. 5 is a flowchart according to a second embodiment for detecting static routes in a network device. In process block 510, advertised prefixes are collected. For example, in FIG. 1, the advertised prefixes 141 can be collected by a routing table collector 140. The advertised prefixes can be extracted and identified in the routing table 222 (FIG. 2). In process block 520, identification information for network traffic can be collected. For example, in FIG. 1, the identification information can be traffic flow data 162 collected by the traffic collector 144. The identification information can include at least a source and destination IP address. Additionally, the destination IP addresses can be converted into a prefixes. In process block 530, static routes can be detected by comparing the advertised prefixes from the identification information. For example, in FIG. 1, the static route determiner 142 can determine the static routes through a subtraction operation. The subtraction results in any matching prefixes being canceled and only mismatching prefixes remain. Other techniques for comparison can also be used. The remaining prefixes were not advertised and are violating the eBGP rules. Consequently, corrective action can be taken to force compliance with the protocol.

Figure 6:
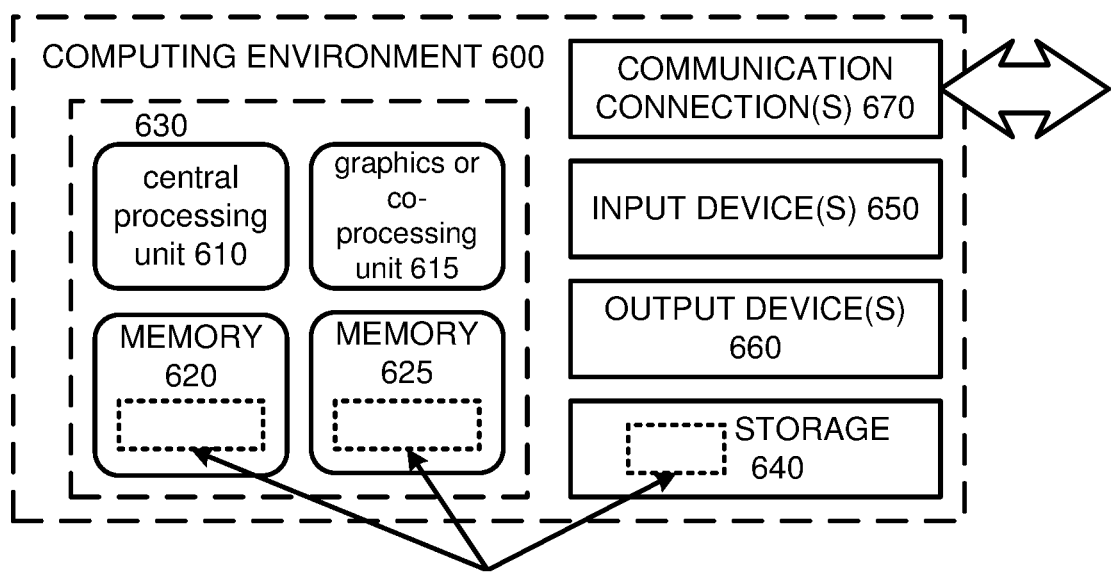
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of detecting static routes in a network, the method comprising:
   receiving prefixes advertised by a network device;
   receiving traffic flow data for network traffic that was transmitted through the network device;
   for the received traffic flow data, filtering the traffic flow data to remove all traffic transmitted from a compute service provider network to outside of the compute service provider network so that the filtered traffic flow data includes network traffic transmitted to the compute service provider network;
   comparing the advertised prefixes to the filtered traffic flow data;
   based upon the comparison, identifying traffic that is following a static route being transmitted towards the compute service provider network through the network device; and
   transmitting an alarm condition associated with the static routes.

2. The method of claim 1, further including converting the filtered traffic flow data to prefixes for comparison to the advertised prefixes.

3. The method of claim 1, wherein the network device is an edge network device.

4. The method of claim 1, wherein the advertised prefixes are advertised from the network device to autonomous systems using an External Border Gateway Protocol (eBGP).

5. The method of claim 1, further including, in response to the alarm condition, applying a filter to further reduce or eliminate the traffic that is following the static routes.

6. A method, comprising:
   collecting advertised prefixes associated with a network device;
   collecting identification information for network traffic passing through the network device;
   detecting static routes by comparing the advertised prefixes to the identification information for the network traffic passing through the network device; and
   transmitting alarm information based upon the detected static routes, wherein the alarm information includes a request to cease transmission of the static routes.

7. The method of claim 6, wherein the collecting of the advertised prefixes includes receiving a routing table from the network device and using entries in the routing table as advertised prefixes.

8. The method of claim 6, wherein the collecting of identification information for network traffic includes receiving source and destination addresses associated with packets passed through the network device.

9. The method of claim 8, further including filtering the collected identification information to eliminate network traffic not received from a third-party network.

10. The method of claim 9, further including converting the filtered collected identification information to prefixes for comparison to the advertised prefixes.

11. The method of claim 6, further including monitoring for removal of the static routes from the network device.

12. The method of claim 6, wherein the network device is an edge network device.

13. The method of claim 6, wherein the advertised prefixes are advertised from the network device to autonomous systems using an External Border Gateway Protocol (eBGP).

14. A system, comprising:
   a network device;
   a first server computer for capturing traffic information that passes through the network device;
   a second server computer for capturing a routing table within the network device; and
   a third server computer coupled to the first and second server computers for extracting advertised prefixes from the routing table and received prefix destinations from the traffic information and for comparing the advertised prefixes to the received prefix destinations to detect static routes that passed through the network device.

15. The system of claim 14, wherein the first, second and third server computers are within a data center of a compute service provider.

16. The system of claim 15, wherein the network device is an edge device for allowing communications from outside the compute service provider to be received in the compute service provider.

17. The system of claim 14, wherein the first server computer is configured to filter the traffic information based upon a direction of traffic into or out of a compute service provider.

18. The system of claim 14, wherein the comparing includes subtracting matching advertised prefixes and received prefix destinations and wherein the static routes are for prefixes that have no match.

19. The system of claim 14, wherein the third server computer is configured to trigger an alarm in response to the detection of the static routes and wherein the alarm is used to mitigate the static routes.

20. A method, comprising:
   collecting advertised prefixes associated with a network device, wherein the advertised prefixes are advertised from the network device to autonomous systems using an External Border Gateway Protocol (eBGP);
   collecting identification information for network traffic passing through the network device; and
   detecting static routes by comparing the advertised prefixes to the identification information for the network traffic passing through the network device.

* * * * *